July 17, 1956     A. S. DAWE     2,754,628
HEAT-TREATING FRANGIBLE GLASS ARTICLES
Filed April 15, 1953     4 Sheets-Sheet 1

INVENTOR:
ALLEN S. DAWE
BY
ATTORNEYS

INVENTOR:
ALLEN S. DAWE

July 17, 1956 A. S. DAWE 2,754,628
HEAT-TREATING FRANGIBLE GLASS ARTICLES
Filed April 15, 1953 4 Sheets-Sheet 3

INVENTOR:
ALLEN S. DAWE
BY
ATTORNEYS

July 17, 1956 A. S. DAWE 2,754,628
HEAT-TREATING FRANGIBLE GLASS ARTICLES
Filed April 15, 1953 4 Sheets-Sheet 4

INVENTOR:
ALLEN S. DAWE
BY
ATTORNEYS

United States Patent Office 2,754,628
Patented July 17, 1956

2,754,628
HEAT-TREATING FRANGIBLE GLASS ARTICLES

Allen S. Dawe, Floral Park, N. Y., assignor to J. O. Ross Engineering Corporation, New York, N. Y., a corporation of New Jersey Application April 15, 1953, Serial No. 348,925

3 Claims. (Cl. 49—47)

This invention relates to the heat treatment of frangible articles, and has particular reference to the controlled cooling of relatively large, irregularly-shaped glass envelopes such as the envelopes of television tubes, although the invention is not limited to that use.

In the manufacture of television tubes and similar interiorly-coated glass envelopes, one step in the manufacturing operation involves applying the fluorescent screen and masking materials to the interior surface thereof which includes a baking operation requiring the heating of the tube while doing so, with the result that substantial internal stresses are set up in the glass which are likely to cause breakage during subsequent processing operations, particularly when the tube is being evacuated with a resultant pressure differential between the interior and exterior thereof. Such glass stresses are particularly pronounced at the relatively sharp edge where the large thick screen end of the tube merges into the relatively thinner conical body of the tube, and consequently, breakage is usually initiated at that point during the evacuation stage. It is accordingly desirable to so cool the glass during the evacuating stage as to substantially eliminate the thermal stresses which cause breakage during evacuation and structurally weaken the tube if it escapes process breakage. However, owing to the varying wall thickness of the glass envelope and its irregular shape, that desirable result has not been heretofore achieved, and it is the principal object of this invention to attain that end.

In accordance with the present invention, a process and an apparatus are provided which effect selective cooling of the tube envelope after the heating operation and during evacuation thereof at a rate conforming with the heat emission rate of the different areas of the envelope so that no thermal stresses are set up within the glass to impair the strength of the envelope, thereby precluding substantial breakage during processing and otherwise weakening of the tube.

In the preferred mode of conducting the process of this invention, the glass envelope is cooled by the removal of heat therefrom at a rate according with the thickness and superficial area of the different portions of the tube, so that every unit of volume of the glass of the tube is uniformly cooled progressively at the same rate. Accordingly, notwithstanding the differential pressure between the interior and the exterior thereof during the simultaneous evacuation and cooling step, no stresses are set up in the glass which will result in breakage of the tube or other impairment thereof.

The preferred embodiment of the apparatus of this invention for carrying out the aforementioned glass envelope cooling process comprises an elongated tunnel of good heat-conducting material through which the tubes are carried in erect, inverted position by a continuous conveyor system and whose exterior surface is washed by a continuous stream of cooling air moving in such direction as to remove heat from the different units of area of the surface of the tunnel at the same rate that heat emitted by the heated envelope is transmitted to the tunnel surfaces, which emission rate generally accords with the area-thickness ratio of the envelope opposite the portion of the tunnel receiving the emitted heat. The tunnel is so shaped to effect this heat transfer and conveniently the cooling air moving over the outer surface of the tunnel flows countercurrently to the hotter-to-cooler portions of the envelope, so that the cooler air engages the tunnel opposite the tube portion emitting greatest heat, and vice versa, whereby the thin parts of the tube are cooled at the same rate as the thick parts of the tube, even though the former normally cool more rapidly than the latter.

It will be seen that the process and apparatus provided by this invention for cooling frangible articles such as bulbous or otherwise non-uniformly-shaped glass envelopes enables rapid, uniform and economical production of finished articles of the general nature of television, radar, magnetron and like tubes without substantial loss due to breakage and without impairing their strength in use. By means of the invention, the length of the cooling time is reduced about one-third over present practice and the percentage of breakage is reduced by about half, all other things remaining equal.

For a more complete understanding of the invention, reference may be had to the accompanying drawings, in which.

Figure 2:
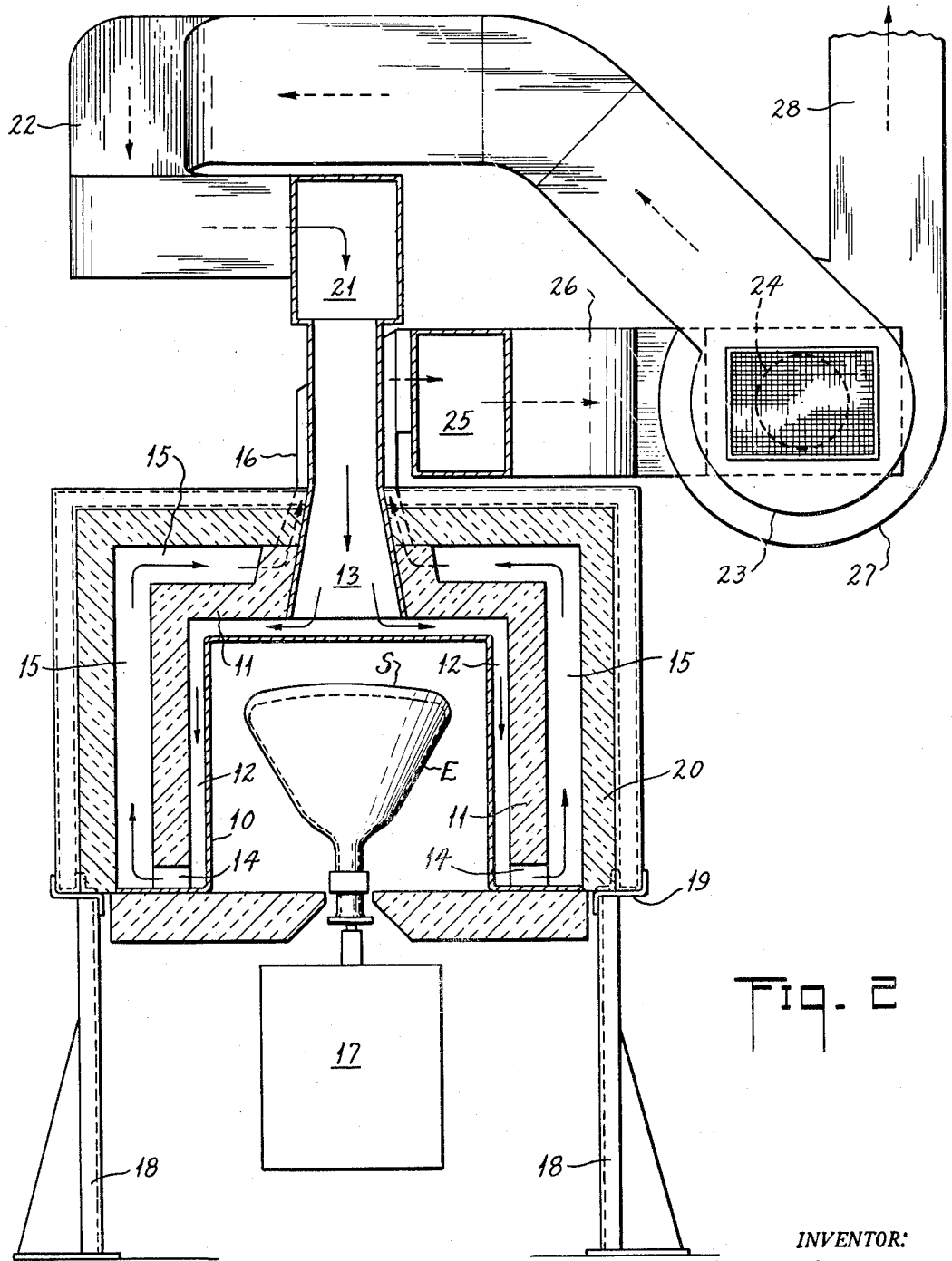
Fig. 2 is an enlarged transverse section therethrough as seen along the line 2—2 of Fig. 1, and illustrates the flow of cooling air around the tunnel through which the envelopes are conveyed.
Figure 4:
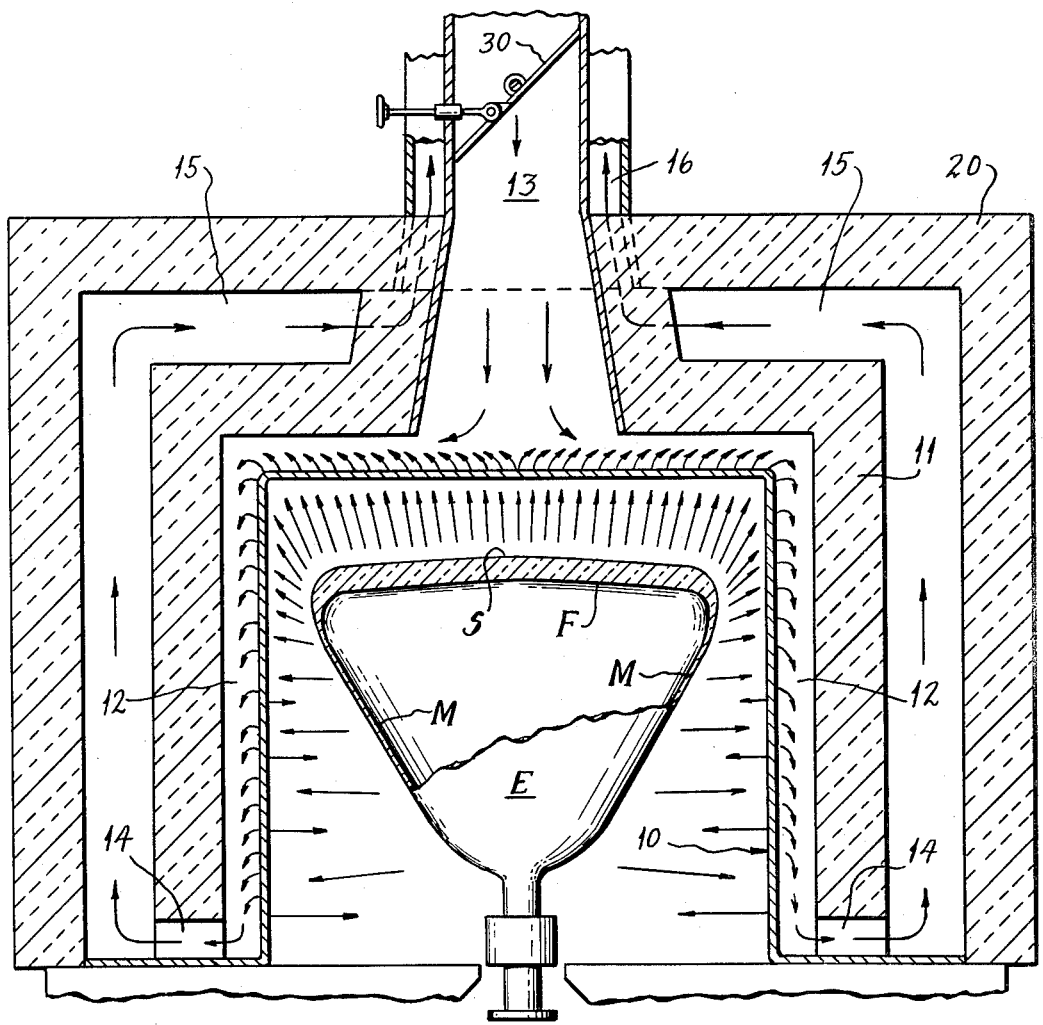
Fig. 4 illustrates somewhat schematically by density of arrows, the relative rate of heat removal from a glass television tube envelope according to the process of this invention.

In processing television tubes as an example of the utility of the invention, the glass envelopes E are continuously conveyed by a conventional conveying system through a heating zone wherein the envelopes are progressively heated up to about 400° C. to bake into a homogeneous film the fluorescent screen material F deposited on the under surface of the thick glass screen S as well as the masking material M deposited on the interior surface of the conical part of the envelope E, as indicated in Figs. 2 and 4. This baking temperature is attained in about 20 minutes by known means, such as by heated air circulated in and around the envelopes E, the heating-up rate to about 400° C., being substantially uniform as shown by section I of Fig. 5, and the 400° C. baking temperature being maintained for about 10 minutes, as shown by section II of Fig. 5.

It will be understood that the heating rate depends upon the volume and temperature of the heating air, the size of the envelope E and the nature of the materials F and M being baked, the particular heating methods and apparatus being immaterial and forming no part of the present invention, and are described generally in order to indicate the highly heated state of the envelope E at the time that the present invention comes into operation.

As is well understood, television, radar and other types of cathode ray tubes, magnetron, Klystron and other types of velocity modulated electron tubes, and other electronic space discharge tubes, are highly evacuated, and, therefore, a differential pressure approaching one atmosphere exists between the interior and exterior surfaces of the tubes. It is customary and desirable in manufacturing such tubes to evacuate the tube while cooling the same down from the hot processing temperatures, such as the screen baking temperature on the order of 400° C. in television tubes, for example.

In cooling any glass envelope from a high temperature, thermal stresses are set up in the glass itself, rendering the tube susceptible to breakage as it cools. In the case of television tubes, the thermal stresses that develop during cooling are especially aggravated because the viewing screen is relatively thick, about ¾ inch, and frequently rectangular, and merges at its perimeter into a thin-walled cone at an acute angle, on the order of 60°, so that highest thermal stresses occur at the juncture between the thick glass screen portion and the thin-walled cone portion of the tube. Consequently, breakage during cooling is initiated at that point, although any flaw in the glass, such as a surface scratch elsewhere, may cause the collapse to be initiated at that point.

Inasmuch as evacuation of the envelope is preferably carried on simultaneously with cooling, the resulting pressure differential usually causes breakage to occur during the evacuation stage. However, even if a tube survives evacuation and cooling and is still highly thermally stressed, the tube is weak and will readily break in subsequent service or during assembly in the electronic circuit, and the like.

Figure 5:
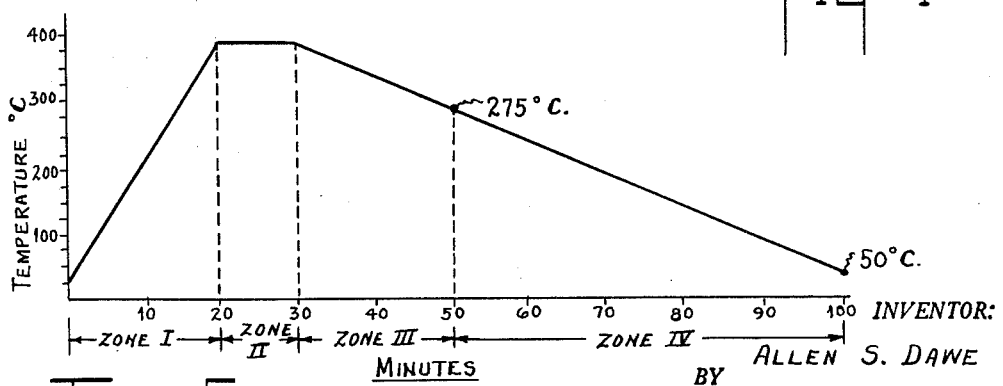
Fig. 5 illustrates the heat exchange curve according to which the process of this invention is carried out in the apparatus of this invention.

The critical zone on the cooling curve where breakage usually occurs during evacuation, in the absence of the present invention, lies between about 400° C. and about 275° C. as is indicated by zone III following the 400° C. holding zone II shown in Fig. 5. If the tube were to be cooled down uniformly throughout every unit of volume of the glass constituting the envelope E, regardless of the thickness thereof, the internal glass stresses would be gradually compensated for and relieved as the tube cools down through zone III, and also the ensuing zone IV to a temperature of about 50° C. approaching room temperature.

The aforementioned desirable result is accomplished according to the method of the invention and with the apparatus of this invention in a manner shown more or less schematically in Fig. 4 where the envelope E, having been baked in zone II at a temperature on the order of 400° C., enters the cooling zone. The cooling zone III and subsequent cooling zone IV are jointly provided in the preferred apparatus by a metal wall tunnel 10 through which a series of envelopes E are conveyed progressively from the heating of zone I through baking zone II immediately preceding cooling zone III which is depicted in Fig. 4.

The cross-sectional shape of the tunnel 10 generally conforms to the contour of the envelope E, i. e., the tunnel 10 is generally rectangular opposite the relatively flat, thick walled spaced screen end S of the envelope E and is spaced relatively uniformly therefrom.

The tunnel 10 is enclosed in and surrounded by an insulating wall 11 which is spaced from the exterior surface of the tunnel 10 so as to form the relatively narrow passage 12. Leading downwardly into the top of passage 12 is a cooling air duct 13 through which a large volume of cooling air is supplied. The space or passage 12 extends down the exterior sides of tunnel 10 to the bottom to spent cooling air slots 14.

The cooling air entering passage 12 from duct 13 preferably is of room temperature and as it impinges against the horizontal upper surface of the tunnel 10, the cooling air stream divides and flows over the outer surface of metal tunnel 10 to exhaust through lower slots 14 at either side. In view of the proximity and shape of the upper horizontal surface of the metal tunnel 10 to the relatively flat screen end S of the envelope E, the large volume of cooling air stream washing the upper surface of the tunnel 10 removes the heat absorbed thereby by reason of radiant transfer thereto from the screen end S at a rate commensurate with the rate of emission.

Because the screen S is thick, on the order of ¾ inch, and is heated to approximately 400° C., the rate of heat emission therefrom is relatively high, as is indicated schematically by the density of the arrows shown in Fig. 4 radiating from the surface of the screen S. Similarly, the density of the arrows shown in Fig. 4 as extending from the upper surface of the tunnel 10 is intended to represent the rate of heat absorbed from the tunnel surface by the cooling air in passages 12, so that as the air moves over the upper surface of the tunnel toward the vertical passages 12 at either side thereof, it is heated from room temperature to a temperature on the order of 300° C., more or less, by the time it leaves the exit slots 14, so that the air flows counter to the rate of heat emission from the envelope E, considering that the thin conical portion of the latter emits heat at a slower rate than does the thick screen S. Accordingly, the side walls of the tunnel 10 absorb less heat from the thin-walled portion of the envelope E than does the upper surface thereof.

As the envelope E is carried through the tunnel 10, it is gradually cooled through the critical stage III of Fig. 5. During the cooling stages III and IV, heat is transferred to the lower portion of the conical envelope from the heated air descending in passage 12 as indicated by the inwardly directed arrows in Fig. 4, so as to preclude cooling of the thinner converging portions of the envelope E at a greater rate than that at which the thicker or screen portion S is cooled.

Figure 3:
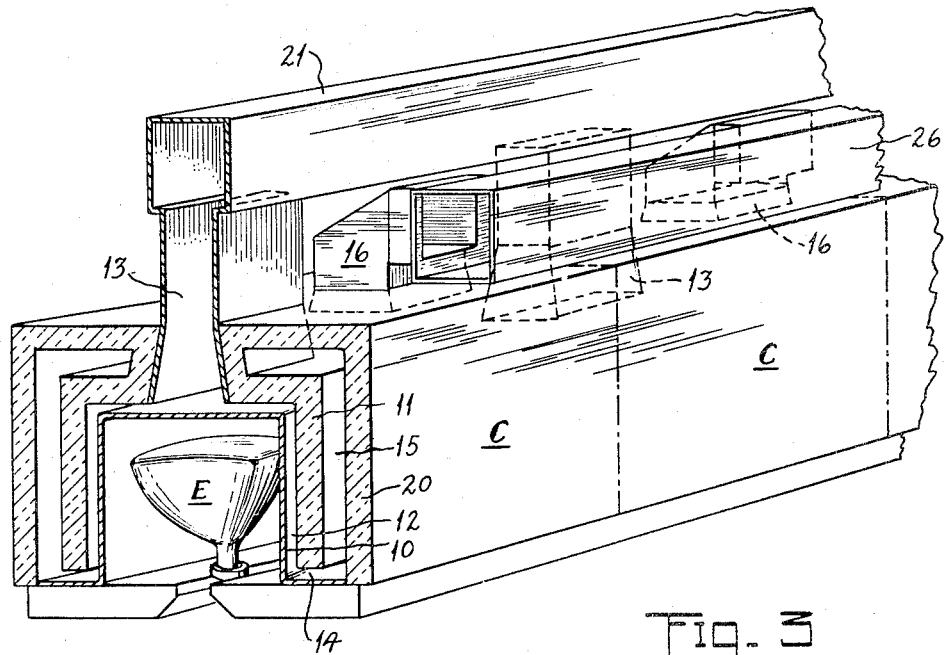
Fig. 3 is a perspective view of the apparatus looking in the general direction of Fig. 2, and illustrates the cooling and exhaust air circulation.

The high temperature spent cooling air flowing through slots 14 along the lower edges of tunnel 10 is then removed through passages 15 to a spent cooling air stack or duct 16. As shown in Figs. 2, 3 and 4, the passages 15 are insulated from the passages 12 by the insulating wall 11, so that the air flowing in passages 12 is heated only by the tunnel 10 which in turn, is heated by the envelope E.

Referring to Figs. 2 and 3, which illustrate cross-sections and perspective views, respectively, of the apparatus in which the aforementioned cooling process may be carried out, these views of the apparatus correspond to that just described in connection with the schematic diagram of Fig. 4. In Figs. 2 and 3, the heat-absorbing and re-radiating metal tunnel is designated 10 and the glass envelope is designated E, as before. The envelopes E are closely spaced, preferably on the order of two feet apart. The conveying system which, along with the tube evacuating system form no part of the present invention, are enclosed in the conduit 17 positioned beneath the tunnel 10 which is mounted on the supporting legs 18 by a platform 19 which also carries the insulating enclosure 11 and the overall housing 20. Housing 20 is of insulating material and is spaced from enclosure 11 so as to afford the passages 15 into which the spent cooling air is evacuated from jacket passages 12 through the lower slots 14. As shown in Fig. 2, the envelopes E are carried in an erect, inverted position through the tunnel 10 by the conveying mechanism in conduit 17.

Referring especially to the perspective view of Fig. 3, the ducts 13 which supply the cooling air to the passages 12 are spaced along the tunnel 10 at a predetermined distance of say, four feet, as in a typical installation. Alternately interposed between the cooling air ducts 13 are the spent cooling air exhaust ducts 16, also spaced apart about four feet, i. e., two feet from the adjacent cooling air ducts 13. One cooling air duct 13 and one exhaust duct 16 comprise one four-foot cell, indicated at C in Fig. 3.

Figure 1:
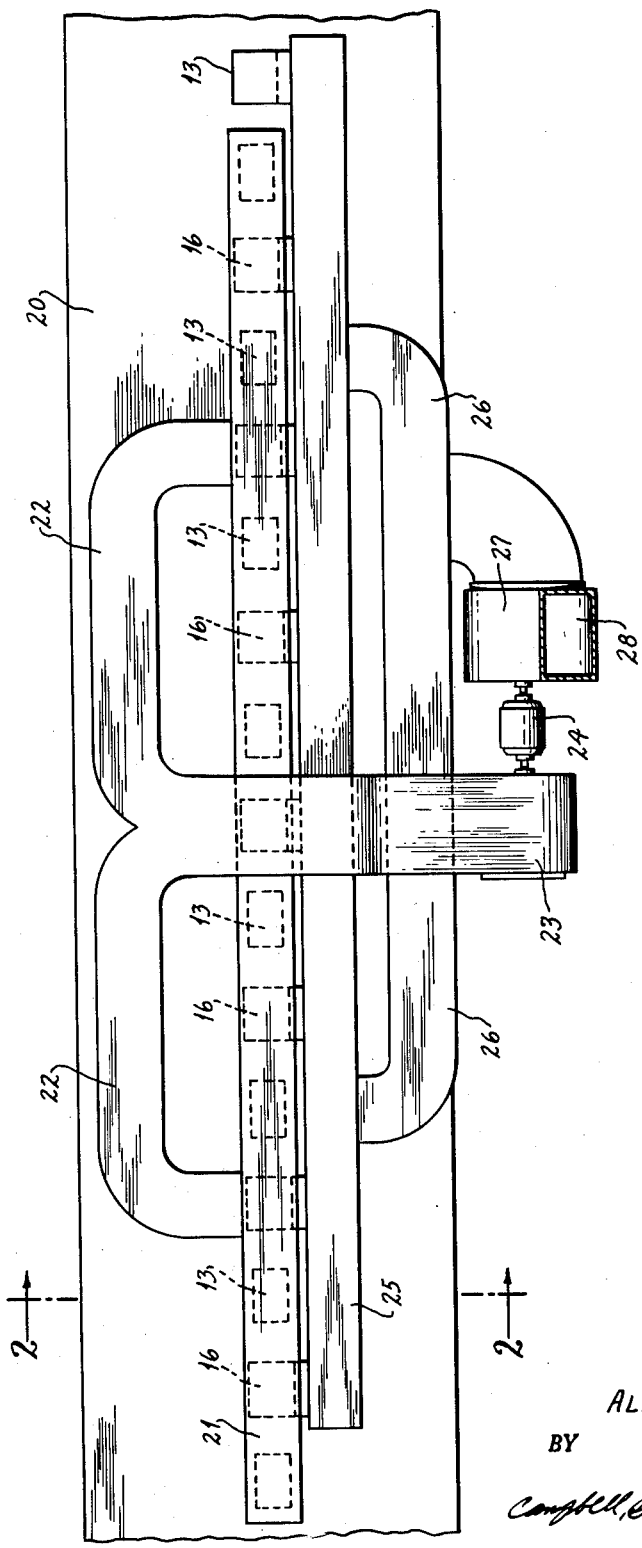
Figure 1 is a plan view of the glass envelope cooling apparatus of this invention in which the process of this invention may be carried out.

The cooling air ducts 13 are connected to a header 21 extending along the top of the housing 20 and in turn supplied by supply ducts 22 connected to the output of a blower 23 driven by a suitable motor 24 in the manner especially shown in Figs. 1 and 2.

The spent cooling air ducts 16 are similarly connected to a spent cooling air header 25 extending along the top of the housing 20 and connected by branch ducts 26 to the suction eye of a large blower 27, also preferably driven by motor 24 and mounted coaxially therewith. As shown in Fig. 2, the exhaust 28 of the blower 27 leads to a suitable exhaust stack.

In operation of the frangible envelope cooling system of this invention, the hot envelopes E which may be television tubes in the illustrative case, are moved continuously by a conveying system in conduit 17 through the tunnel 10 from the prior baking process step and have a temperature on the order of 400° C. as they enter cooling zone III of Fig. 5. The cooling air washing the exterior surface of the metal tunnel 10 flows in a counter direction to the rate of heat emission of the envelope E to the tunnel 10, so that the coolest air strikes the hottest portion of the tunnel 10, i. e., at the upper center surface thereof. The cool air, initially at room temperature, absorbs heat from the surface of tunnel 10 at a progressively decreasing rate as it flows down the sides of the tunnel 10 opposite the thinner portions of the envelope E, which emit heat at a slower rate than does the thick portion of the tube at the screen end S. As the cooling air descends along the sides of the tunnel 10, it becomes progressively hotter, although at a slower rate and reaches a temperature opposite the thin conical portion of the envelope E higher than the temperature thereof, so that the air gives off or returns heat to the thinner portions of the envelope E, whereby the latter will not be cooled at a greater rate than is the thicker screen portion S of the tube at the top of the tunnel 10. Thus, a uniform temperature gradient on a descending scale is maintained between the outside surfaces of the tunnel 10 and the air flowing through passages 12, so that heat removal is accelerated at the thicker screen end S of the tube and retarded at the thinner or conical end of the tube, as is indicated schematically by the density of the arrows in Fig. 4.

The large volume of cooling air supplied by inlet ducts 13 in a typical case is such as to reduce the temperature of the envelope E about 4½° C. per minute in a typical installation, so that the envelopes emerge from cooling zone IV after a cooling-down period in zones III and IV of about 70 minutes at a temperature of about 50° C. The throughput is 60 tubes per hour from a cooling tunnel 10 of approximately 200 feet in length comprising 50 cells C in series. It will be understood that the cooling rate varies in accordance with the heat to be removed from the envelopes E which vary in size and the thickness of their glass walls. However, in any case, the shape of the tunnel 10 accommodates the shape of the envelope E and the varying thickness of its walls so as to automatically remove heat at the requisite rate to afford cooling of every unit of volume of the glass of the envelope E at the same rate. This uniform cooling precludes the development of internal stresses within the glass which lead to breakage in zone III between the highest temperature of about 400° C. and the temperature of about 275° C. where breakage occurs in the usual process and is substantially eliminated with the present invention. At the same time, the glass is permanently relieved of internal thermal stresses which weaken the envelope so that it breaks readily during assembly and usage.

Inasmuch as uniformity of heat removal from each unit of volume of the glass of envelope E is desired, no matter what may be its shape and wall thickness variation, it is important to have proportionally large volumes of air available for heat absorption opposite those areas of the envelope emitting greater heat. For example, in a typical case, the volume of cooling air supplied to each cell C is between 925 and 1250 C. F. M.

Figure 6:
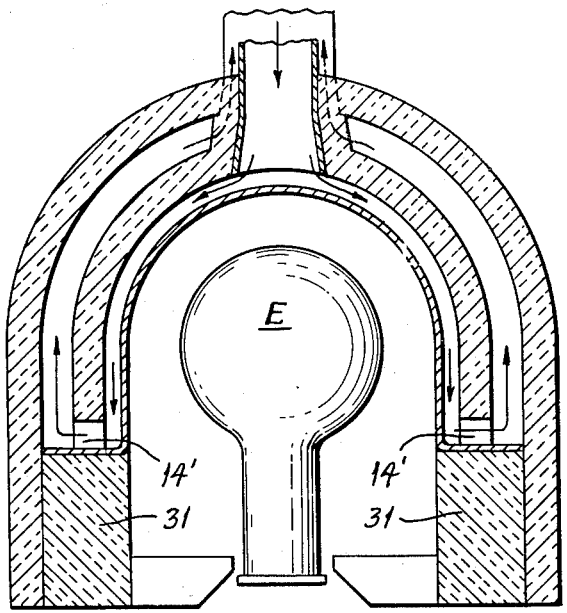
Fig. 6 is a cross-section through a modified form of apparatus.

Envelopes of other shapes, such as a hemispherical dome shape require tunnel 10 approaching a dome shape in cross-section, as shown in Fig. 6, for example. Also, where the base of lower portion of the envelope E is not of such thickness to require heating while the thicker portions are still cooling, the return slots 14' may be at a higher level, with the tunnel wall below slots 14' formed of insulating material 31, as shown in Fig. 6.

Heat transfer rate may be augmented in known ways as by finning the inner or outer, or both, surfaces of tunnel 10, vertically corrugating the same, and the like. Dampers 30 shown in Fig. 4 will be employed to regulate the rate of cooling air flow in each cell, and the other known regulating means may be employed as required.

Although a preferred embodiment of the invention has been illustrated and described herein, it is to be understood that the invention is not limited thereby, but is susceptible of changes in form and detail within the scope of the appended claims.

I claim:

1. A method of treating a preheated glass envelope having a varying wall thickness, which comprises removing the heat from the thicker portions thereof by transfer to a cooling fluid circulated around a heat-transmitting enclosure having substantially the shape of said envelope, said cooling fluid being directed against said enclosure adjacent the thicker portions of the said envelope and around said enclosure toward the thinner portions of said envelope to retransfer heat from said fluid to said enclosure for maintaining the temperature of other portions of said envelope substantially equal to the temperature of said first portions thereof.

2. In apparatus for uniformly cooling a pre-selected glass envelope having portions of varying thickness, the combination of an elongated tunnel of heat conducting material, means for conveying a series of said envelopes in spaced relation through said tunnel, an elongated enclosure for said tunnel and spaced from the external surfaces thereof to afford passages around the exterior thereof, air supply means spaced along the upper portion of said enclosure and leading into said passages for directing cooling air into said passages adjacent to the thicker portions of said envelope for flow through the passages to remove the heat transmitted to said tunnel by said envelope, air outlet means leading from said passages adjacent the thinner portions of said envelope for exhausting spent cooling air, an elongated housing for said enclosure and spaced from the external surfaces thereof to afford a space communicating with said outlet means, and exhaust means interposed between said air supply means along the upper portion of said housing for removing spent cooling air from said space.

3. In apparatus for uniformly cooling a preselected glass envelope, the combination of an elongated tunnel of heat conducting material, means for conveying a series of said envelopes in spaced relation through said tunnel, an elongated enclosure for said tunnel and spaced from the external surfaces thereof to afford passages around the exterior thereof, air supply means spaced along the upper portion of said enclosure and leading into said passages for circulating cooling air therethrough for removing the heat transmitted to said tunnel by said envelope, air outlet means leading from said passages adjacent the bottom of said tunnel for exhausting spent cooling air, an elongated housing for said enclosure and spaced from the external surfaces thereof to afford a space communicating with said outlet means, and exhaust means interposed between said cooling air supply means along the upper portion of said housing for removing spent cooling air from said space.

References Cited in the file of this patent

UNITED STATES PATENTS

| Number | Name | Date |
| --- | --- | --- |
| 1,510,556 | Owens | Oct. 7, 1924 |
| 1,804,657 | Talbot | May 12, 1931 |
| 1,951,950 | Rising | Mar. 20, 1934 |
| 1,981,560 | Littleton | Nov. 20, 1934 |
| 2,026,781 | Geer | Jan. 7, 1936 |
| 2,375,944 | Quentin | May 15, 1945 |

FOREIGN PATENTS

| Number | Country | Date |
| --- | --- | --- |
| 450,464 | Great Britain | July 17, 1936 |